United States Patent
Bag et al.

(10) Patent No.: US 11,665,563 B2
(45) Date of Patent: May 30, 2023

(54) INTELLIGENT ELECTRONIC DEVICE COMPRISING A CELLULAR RADIO MODULE

(71) Applicant: ABB Schweiz AG, Baden (CH)

(72) Inventors: Gargi Bag, Västerås (SE); Morgan Johansson, Västerås (SE); Petri Hovila, Vaasa (FI); Luka Lednicki, Västerås (SE)

(73) Assignee: ABB Schweiz AG, Baden (CH)

( * ) Notice: Subject to any disclaimer, the term of this patent is extended or adjusted under 35 U.S.C. 154(b) by 97 days.

(21) Appl. No.: 16/979,776

(22) PCT Filed: Feb. 22, 2019

(86) PCT No.: PCT/EP2019/054409
§ 371 (c)(1),
(2) Date: Sep. 10, 2020

(87) PCT Pub. No.: WO2019/174889
PCT Pub. Date: Sep. 19, 2019

(65) Prior Publication Data
US 2021/0022021 A1    Jan. 21, 2021

(30) Foreign Application Priority Data
Mar. 13, 2018    (EP) .................................... 18161412

(51) Int. Cl.
*H04W 24/08*        (2009.01)
*G08C 17/02*        (2006.01)
(Continued)

(52) U.S. Cl.
CPC ............ *H04W 24/08* (2013.01); *G08C 17/02* (2013.01); *H04W 24/04* (2013.01);
(Continued)

(58) Field of Classification Search
CPC ... H04W 24/08; H04W 24/04; H04W 52/241; H04L 1/24; H04L 1/0026; G08C 17/02;
(Continued)

(56) References Cited

U.S. PATENT DOCUMENTS

| | | | |
|---|---|---|---|
| 2006/0056370 A1* | 3/2006 | Hancock | ............... H04W 24/00 370/254 |
| 2008/0170508 A1* | 7/2008 | Popiak | ..................... H04L 1/24 370/252 |

(Continued)

FOREIGN PATENT DOCUMENTS

| | | |
|---|---|---|
| CN | 101354424 A | 1/2009 |
| CN | 102403699 A | 4/2012 |

(Continued)

OTHER PUBLICATIONS

Tholomier et al., Adaptive protection of transmission lines during wide area disturbances, Mar. 15, 2009, IEEE, pp. 1-7.*

(Continued)

*Primary Examiner* — Kwang B Yao
*Assistant Examiner* — Syed M Bokhari
(74) *Attorney, Agent, or Firm* — Whitmyer IP Group LLC

(57) ABSTRACT

A method for enabling communication of data relating to samples of electric measurements, the method being performed in an intelligent electronic device, IED, including a cellular radio module, the IED being configured to protect power system equipment. The method includes the steps of: detecting channel quality using the cellular radio module, the channel quality relating to a channel between the IED and a base station; transmitting packets using the cellular radio module, each packet including data relating to samples of electric measurements for protecting power system equip- (Continued)

ment; and increasing sample rate of the electric measurements when the channel quality is worse than a first threshold.

18 Claims, 3 Drawing Sheets

(51) Int. Cl.
 *H04W 24/04* (2009.01)
 *H04W 52/24* (2009.01)
 *H02J 13/00* (2006.01)
(52) U.S. Cl.
 CPC ..... *H04W 52/241* (2013.01); *H02J 13/00002* (2020.01); *H02J 13/00024* (2020.01)
(58) Field of Classification Search
 CPC .......... H02J 13/00002; H02J 13/00024; Y02E 60/00; Y04S 40/126
 USPC .................................................. 370/252, 254
 See application file for complete search history.

(56) References Cited

U.S. PATENT DOCUMENTS

| | | | | |
|---|---|---|---|---|
| 2011/0284699 | A1* | 11/2011 | Cooper | B61L 3/20 246/28 R |
| 2014/0148212 | A1* | 5/2014 | Gusavac | H04W 52/367 455/522 |
| 2017/0307676 | A1* | 10/2017 | Gaouda | G01R 31/62 |
| 2018/0287422 | A1* | 10/2018 | Seewald | H02J 13/00016 |

FOREIGN PATENT DOCUMENTS

| | | |
|---|---|---|
| CN | 103199896 A | 7/2013 |
| CN | 103297191 A | 9/2013 |
| CN | 103684469 A | 3/2014 |
| CN | 103701465 A | 4/2014 |
| EP | 1359696 A3 | 9/2006 |
| EP | 3206046 A1 | 8/2017 |

OTHER PUBLICATIONS

Abb: IEC 61850 Communication Protocol Manual, Feb. 1, 2001; Retrieved from the Internet: URL: https://www.naic.edu/phil/hardware/sitePower/evd4/1MRK511242-UEN_-_en_Communication_protocol_manual_IEC_61850_650_series_IEC.pdf; [retrieved on Sep. 6, 2018].
Tholomier D et al: Adaptive protection of transmission lines during wide area disturbances; Power Systems Conference and Exposition 2009, PES 09 IEEE/PES, Piscataway NJ USA; Mar. 15, 2009; ISBN: 978-1-4244-3810-5; pp. 1-7.
PCT International Search Report & Written Opinion of the International Searching Authority; Application No. PCT / EP2019/054409; Completed: Mar. 14, 2019; dated Mar. 29, 2019; 17 Pages.
IEEE Standard for SCADA and Automation Sytems; IEEE Std C37.1-2007 (Revision of IEEE Std C37.1-1994) ED-Anonymous; IEEE Standard; Piscataway NJ USA; May 8, 2008; ISBN: 978-0-7381-5378-0; pp. 1-143.
Lixia, Zhang, et al.; "Modified On-line detection technology of harmonics in power system"; Fourtieth IAS Annual Meeting, Conference Record of the 2005 Industry Applications Conference; IEEE; Hong Kong, China; Oct. 2, 2005; 4 Pages.
IEEE Power Engineering Society; "IEEE Standard for SCADA and Automation Systems"; IEEE Std C37.1-2007 (Revision of IEEE Std C37.1-1994); IEEE; May 8, 2008; 200 Pages.
Tholomier, Damien, et al.; "Adaptive Protection of Transmission Lines During Wide Area Disturbances"; 2009 IEEE/PES Power Systems Conference and Exposition; IEEE; Seattle, WA; Mar. 15, 2009; 7 Pages.
Naiyi, Zhou, et al.; "Design of Ship Power Line Carrier Communication Module Based on OFDM"; Naval Architecture and Ocean Engineering; Zhejiang Ocean University, Zhoushan 316022; Zhejiang, China; China Academic Journal Electronic Publishing House, vol. 34, No. 12; Dec. 2014; 4 pages.
Japanese Office Action; Application No. 2019800188736; dated Jun. 3, 2021.

* cited by examiner

INTELLIGENT ELECTRONIC DEVICE COMPRISING A CELLULAR RADIO MODULE

TECHNICAL FIELD

The invention relates to a method, an intelligent electronic device, a computer program and a computer program product, for enabling communication for protection of electric equipment where the intelligent electronic device comprising a cellular radio module.

BACKGROUND

Protective IEDs (Intelligent Electronic Devices), such as relays, reclosers/breakers, for line differential protection, currently use point to point wired communication when installed in different substations. The wired communication is reliable, but can be expensive to deploy and is not scalable.

The cost can be reduced if the wired communication is replaced by utilizing the readily available communication infrastructure such as public cellular networks, enhancing flexibility and scalability while reducing cost.

However, current structures of cellular communication networks are not sufficiently reliable or specified for being applied in critical applications such as line differential protection.

"IEEE Standard for SCADA and Automation Systems;" IEEE Std C370.1-2007 (Revision of IEEE Std C37.1-1994) ED-Anonymous"; PISCATAWAY, N.J., USA, 8 May 2008, pages 1-143, ISBN: 978-0-7381-5378-0, discloses requirements for SCADA and automation systems in substations.

THOLOMIER D ET AL: "Adaptive protection of transmission lines during wide area disturbances", POWER SYSTEMS CONFERENCE AND EXPOSITION, 2009. PES '09. IEEE/PES, PISCATAWAY, N.J., USA, 15 Mar. 2009, pages 1-7, ISBN: 978-1-4244-3810-5, discloses an analysis of the changing system conditions that occur during a disturbance and how they impact protection systems of different types.

SUMMARY

According to a first aspect, it is provided a method for enabling communication of data relating to samples of electric measurements, the method being performed in an intelligent electronic device, IED, comprising a cellular radio module, the IED being configured to protect power system equipment. The method comprises the steps of: detecting channel quality using the cellular radio module, the channel quality relating to a channel between the IED and a base station; transmitting packets using the cellular radio module, each packet comprising data relating to samples of electric measurements for protecting power system equipment; and increasing sample rate of the electric measurements when the channel quality is worse than a first threshold.

The communication may be an end-to-end communication between the IED and a peer IED.

The method may further comprise the step of: increasing transmission power when the channel quality is worse than the first threshold.

The method may further comprise the step of: transmitting a signal to a peer IED indicating that the channel quality is worse than the first threshold.

The method may further comprise the step of: entering a backup mode when the channel quality is worse than a second threshold, wherein the second threshold is more severe than the first threshold, and wherein the backup mode is an operational mode in which protection is performed without the need to communicate with external entities.

The channel quality may be determined using any one or more of signal to noise ratio, signal to interference and noise ratio, and number of packets lost per a unit of time.

The method may further comprise the steps of: evaluating when channel quality deterioration occurs, to determine at what time channel quality deteriorations are more likely to occur; and increasing the sampling rate of the electric measurements, at the time that channel quality deterioration is more likely to occur.

According to a second aspect, it is provided an intelligent electronic device, IED, for enabling communication of data relating to samples of electric measurements, the IED being configured to protect power system equipment. The IED comprises: a processor; a cellular radio module; and a memory storing instructions that, when executed by the processor, cause the IED to: detect channel quality using the cellular radio module, the channel quality relating to a channel between the IED and a base station; transmit packets using the cellular radio module, each packet comprising data relating to samples of electric measurements for protecting power system equipment; and increase sample rate of the electric measurements when the channel quality is worse than a first threshold.

The communication may be an end-to-end communication between the IED and a peer IED.

The IED may further comprise instructions that, when executed by the processor, cause the IED to: increase transmission power when the channel quality is worse than the first threshold.

The IED may further comprise instructions that, when executed by the processor, cause the IED to: transmit a signal to a peer IED indicating that the channel quality is worse than the first threshold.

The IED may further comprise instructions that, when executed by the processor, cause the IED to: enter a backup mode when the channel quality is worse than a second threshold, wherein the second threshold is more severe than the first threshold, and wherein the backup mode is an operational mode in which protection is performed without the need to communicate with external entities.

The channel quality may be determined using any one or more of signal to noise ratio, signal to interference and noise ratio, and number of packets lost per a unit of time.

According to a third aspect, it is provided a computer program for enabling communication of data relating to samples of electric measurements. The computer program comprises computer program code which, when run on an intelligent electronic device, IED being configured to protect power system equipment, causes the IED to: detect channel quality using the cellular radio module, the channel quality relating to a channel between the IED and a base station; transmit packets using the cellular radio module, each packet comprising data relating to samples of electric measurements for protecting power system equipment; and increase sample rate of the electric measurements when the channel quality is worse than a first threshold.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on adaptation of data of data relating to samples of electric measurements, e.g. for protection of electric equipment, when deterioration of channel quality of a cellular network channel occurs. Specifically, this is achieved by increasing sample rate when channel quality is worse than a threshold. In this way, the impact of a single lost packet is significantly reduced. Optionally, transmission power can also be increased to reduce the risk of problems with deteriorated channel quality.

Figure 1:
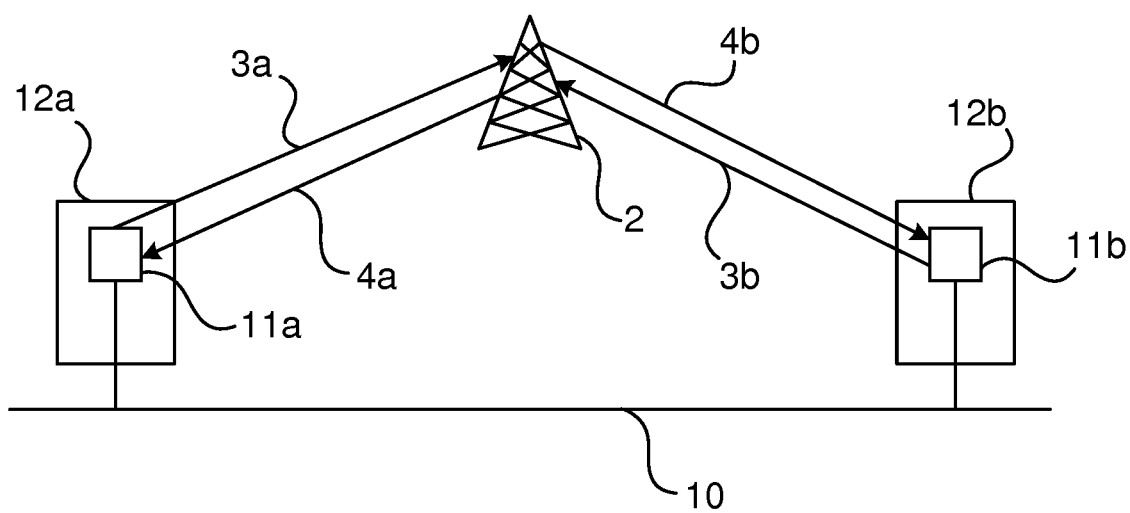
FIG. 1 is a schematic drawing illustrating an environment in which embodiments presented herein can be applied.

FIG. 1 is a schematic drawing illustrating an environment in which embodiments presented herein can be applied. A power transmission line 10 is used to transfer AC (Alternating Current) power in an electric grid. The transmission line 10 can transfer power in either direction. The transmission line 10 comprises separate cables for separate phases, e.g. three phases. The transmission is primarily a medium voltage (MV) transmission. For the purposes of the present disclosure, medium voltage (MV) relates to voltages higher than 1 kV AC and lower than 72 kV AC.

There is a first substation 12a and a second substation 12b. Each of the substations 12a, 12b obtains electric measurements of the transmission line 10 for protecting power system equipment. Both the first substation and the second substation are electrical substations for managing electrical power transfer over the power transmission line. For instance, the substations can comprise components for power conversion and/or power distribution. The electric measurements relate to voltages and/or currents and are expressed as phasors. By communicating the phasors between the two substations 12a, 12b and comparing the phasors, faults can be detected. For this fault detection, line differential analysis can be performed, as known in the art per se. This analysis can be performed in respective relays of the sub-stations 12a, 12b. In order to react quickly to any issues detected using the line differential analysis, latency of communication should be very low and reliability should be high.

A base station 2 of a cellular network provides cellular network coverage for the two substations 12a, 12b. While one base station 2 is shown here, multiple base stations 2 are often deployed to provide sufficient coverage. The base station 2, together with other base stations, form part of a Radio Access Network (RAN).

The first substation 12a comprises a first intelligent electronic device (IED) 11a and the second substation 12b comprises a second IED 11b. The IEDs 11a, 11b are used to protect power system equipment in the respective substations 12a, 12b. IEDs can be implemented in the form of protective relays, reclosers/breakers, etc.

Each one of the first IED 11a and the second IED 11b comprises a respective cellular radio module comprising hardware and software to allow the IEDs 11a, 11b to act as a cellular communication terminal, also known as User Equipment (UE), for communication with the base station 2 using a cellular communication network. The cellular communication network can e.g. comply with any one or a combination of LTE (Long Term Evolution), next generation mobile networks (fifth generation, 5G), UMTS (Universal Mobile Telecommunications System) utilising W-CDMA (Wideband Code Division Multiplex), CDMA2000 (Code Division Multiple Access 2000), or any other current or future wireless network, as long as the principles described hereinafter are applicable.

Wireless cellular communication is prone to interference from other devices and sources operating in the same frequency bands in nearby cells. Moreover, attenuation occurs in extreme weather conditions and fading occurs due to obstructions. In order to use cellular communication for purposes of line differential analysis of a transmission line, both desired latency and reliability of the communication should be ensured.

In the prior art, IEDs were only able to communicate via cellular network using intermediate gateways enabling TCP/IP (Transport Control Protocol/Internet Protocol) routing and VPN (Virtual Private Network) tunnelling. While the intermediate gateway can be used for enabling line differential protection or sending binary trip commands to reclosers/breakers through a public cellular communication network, communication via gateways does not achieve end to end communication between IEDs. This can lead to single point of failure and scalability issues if the gateway needs encapsulation.

In embodiments presented herein, a cellular radio module is provided within the IEDs 11a, 11b, thereby enabling end-to-end communication between the (peer) IEDs 11a, 11b. In this way, there is no need for the intermediate gateway in the substations which introduce a point of vulnerability in the form of a single point of failure and reduces scalability potential. The IEDs perform required signaling with a public cellular network to establish a connection and use the cellular network to send protection related information in IP packets. The IEDs also performs additional functionality, such as taking preventive measures to mitigate effects when bad channel conditions occur.

The first IED 11a can send uplink communication 3a to the base station 2 and receive downlink communication 4a from the base station 2. Analogously, the second IED 11b can send uplink communication 3b to the base station 2 and receive downlink communication 4b from the base station 2. In other words, uplink communication 3a, 3b occurs from IEDs 11a, 11b to the base station 2 and downlink communication 4a, 4b occurs from the base station 2 to the IEDs 11a, 11b. Data is transmitted between the base station and the IEDs 11a, 11b in IP (Internet Protocol) packets.

It is to be noted that more substations and respective IEDs can be provided than those shown in FIG. 1.

Figure 2:
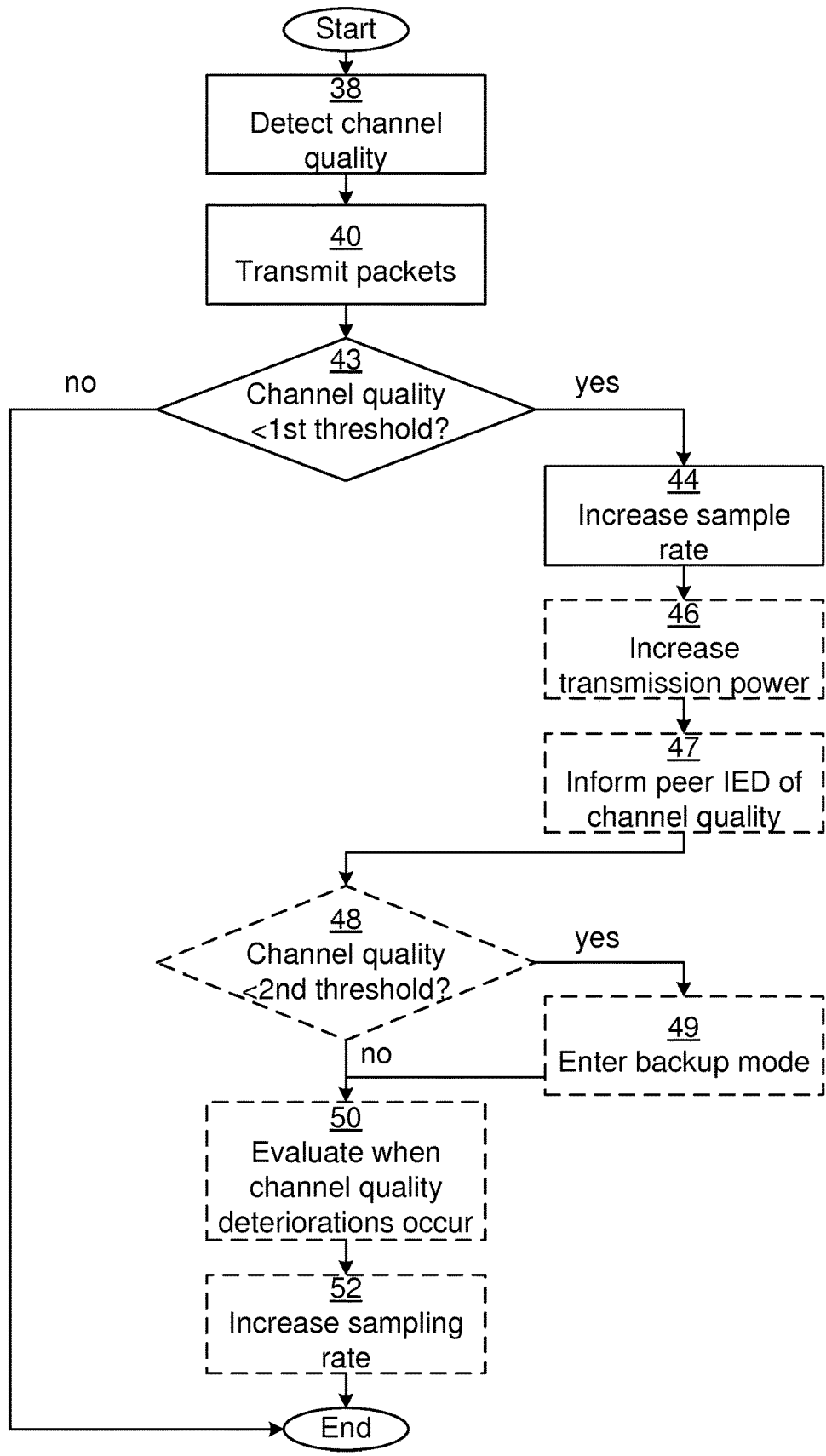
FIG. 2 is a flow chart illustrating embodiments of a method for enabling communication of data relating to samples of electric measurements.

FIG. 2 is a flow chart illustrating embodiments of a method for enabling communication of data relating to samples of electric measurements. The method is performed in an intelligent electronic device, IED, comprising a cellular radio module. The IED is configured to protect power system equipment.

In a detect channel quality step 38, the IED detects channel quality using the cellular radio module. The channel quality relates to a channel between the IED and the base station (also known as radio base station). The channel quality can be determined using any one or more of signal to noise ratio (SIR), signal to interference and noise ratio (SINR), and number of packets lost per a unit of time (of received packets). The packet loss can be detected using an error detecting code, such as Cyclic Redundancy Check (CRC). Even though some measurements, such as packet loss, mainly relate to a receive channel, there is typically a symmetrical (or essentially symmetrical) relationship between the receive channel and transmit channel. According to embodiments presented herein, transmissions are adjusted when channel quality is poor. The channel quality can be expressed in one measurements or multiple measurements. For instance, there can be measurements relating to reliability and/or latency, which often pull against each other, to reach a balanced performance.

In a transmit packets step 40, the IED transmits packets using the cellular radio module. Each packet comprises data relating to samples of electric measurements, e.g. voltage and/or current, for protecting power system equipment. The data relating to samples can be expressed in terms of phasors, as known in the art per se.

In a conditional channel quality <$1^{st}$ threshold step 43, the IED evaluates whether the channel quality is worse than a first threshold. If this is the case, the method proceeds to an increase sample rate step 44. Otherwise, the method ends. When multiple measurements are used for channel quality, these can be aggregated in one scalar and evaluated against a single threshold, or each measurement can be evaluated individually against respective thresholds.

In the increase sample rate step 44, the sample rate of the electric measurements is increased.

In an optional increase transmission power step 46, the IED increases transmission power.

In an optional inform peer IED of channel quality step 47, the IED transmits a signal to a peer IED indicating that the channel quality is worse than the first threshold. This allows the peer IED to also increase its sample rate and/or transmission power.

By adapting transmissions (sampling rate, transmission power) in dependence of channel quality, the negative effects of a poor channel quality are mitigated. Communication over the channel is likely to exhibit symmetrical channel qualities, whereby transmission can also be adapted based on reception quality, e.g. indicated by packet loss. For instance, if packet loss is sporadic, implying that not a long section of consecutive packets are dropped, but that the packet loss still occurs more frequently than in normal condition (indicated by the first threshold), the IED will increase its rate of transmitting samples of electric measurements. Additionally, the IED can inform a peer IED of the deteriorated channel quality, whereby the peer IED can also increase its rate of transmitting samples. Optionally, the IED also directs the radio to increase its transmission power in step 46.

In the optional conditional channel quality <2nd threshold step 48, the IED evaluates whether the channel quality metric is worse than a second threshold. The second threshold is more severe than the first threshold, indicating a worse channel quality condition. If this is the case, the method proceeds to an optional enter backup mode step 49. Otherwise, the method ends, or proceeds to the optional evaluate when channel quality deterioration occurs step 50.

In the optional enter backup mode step 49, the IED enters a backup mode. The backup mode is an operational mode in which protection is performed without the need to communicate with external entities.

In an optional evaluate when channel quality deterioration occurs step 50, the IED evaluates when channel quality deterioration occurs. This is performed in order to determine at what time channel quality deterioration is more likely to occur. For instance, if an IED is located close to a train station, channel quality deterioration might be more likely at rush hours when there are many commuters waiting for a train, leading to more cellular network traffic which increases interference.

In an increase sampling rate step 52, the IED increases the sampling rate of the electric measurements, at the time that channel quality deterioration is more likely to occur. This is a proactive increase in sampling rate, which reduces the risk of detrimental effects of any channel quality deterioration which is expected to occur.

Steps 50 and 52 can occur in a separate execution sequence (e.g. separate process, thread, etc.) of the processor of the IED.

When communication is completely down, the IED can operate in a secure mode, which is an operational state where operation proceeds without need for communication.

Figure 3:
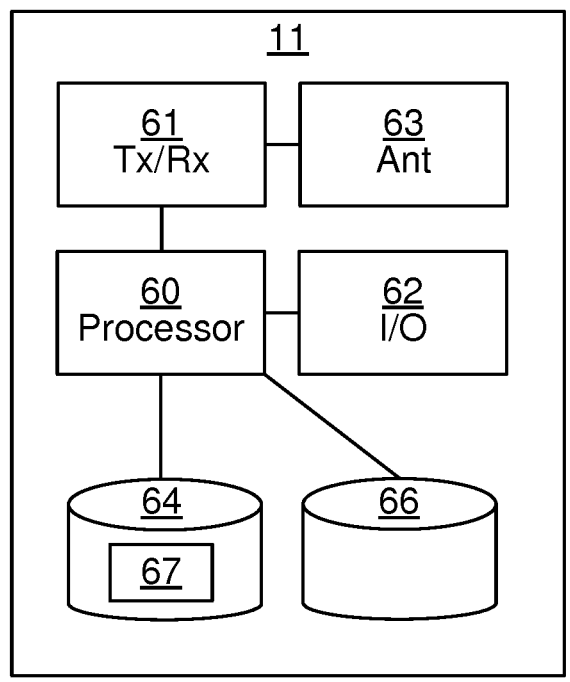
FIG. 3 is a schematic diagram illustrating components of an embodiment of the edge computing device of FIG. 1.

FIG. 3 is a schematic diagram illustrating components of an embodiment of the IEDs 11a, 11b of FIG. 1, here represented by a single IED 11. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 2 above.

The memory 64 can be any combination of random access memory (RAM) and/or read only memory (ROM). The memory 64 also comprises persistent storage, which, for example, can be any single one or combination of magnetic memory, optical memory, solid-state memory or even remotely mounted memory. The software instructions 67 can be in the form of one of several software applications which are executable by the processor 60.

A data memory 66 is also provided for reading and/or storing data during execution of software instructions in the processor 60. The data memory 66 can be any combination of RAM and/or ROM.

The IED 11 further comprises an I/O interface 62 for communicating with other external entities. Optionally, the I/O interface 62 also includes a user interface.

A cellular radio module 61 comprises suitable analogue and digital components to allow signal transmission and signal reception with a cellular network using one or more antennas 63. The cellular network can e.g. comply with any one or a combination of LTE (Long Term Evolution), next generation mobile networks (fifth generation, 5G), UMTS (Universal Mobile Telecommunications System) utilising W-CDMA (Wideband Code Division Multiplex), CDMA2000 (Code Division Multiple Access 2000), or any other current or future wireless network, as long as the principles described herein.

Other components of the IED 11 are omitted in order not to obscure the concepts presented herein.

Figure 4:
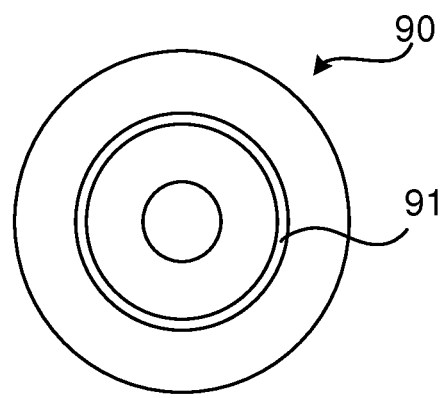
FIG. 4 shows one example of a computer program product comprising computer readable means.

FIG. 4 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 3. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments from another perspective, enumerated with roman numerals.

i. A method for enabling communication for protection of electric equipment, the method being performed in an intelligent electronic device, IED, comprising a cellular radio module, the IED being configured to protect power system equipment, the method comprising the steps of:
  detecting channel quality using the cellular radio module;
  transmitting packets using the cellular radio module, each packet comprising data relating to samples of electric measurements for protecting power system equipment; and
  increasing sample rate of the electric measurements when the channel quality is worse than a first threshold.

ii. The method according to embodiment i, wherein the communication is an end-to-end communication between the IED and a peer IED.

iii. The method according to embodiment i or ii, wherein the method further comprises the step of:
  increasing transmission power when the channel quality is worse than the first threshold.

iv. The method according to any one of the preceding embodiments, wherein the method further comprises the step of:
  transmitting a signal to a peer IED indicating that the channel quality is worse than the first threshold.

v. The method according to any one of the preceding embodiments, wherein the method further comprises the step of:
  entering a backup mode when the channel quality is worse than a second threshold, wherein the second threshold is more severe than the first threshold, and wherein the backup mode is an operational mode in which protection is performed without the need to communicate with external entities.

vi. The method according to any one of the preceding embodiments, wherein the channel quality is determined using any one or more of signal to noise ratio, signal to interference and noise ratio, and number of packets lost per a unit of time.

vii. The method according to any one of the preceding embodiments, further comprising the steps of:
  evaluating when channel quality deterioration occurs, to determine at what time channel quality deteriorations are more likely to occur; and
  increasing the sampling rate of the electric measurements, at the time that channel quality deterioration is more likely to occur.

viii. The method according to any one of the preceding embodiments, wherein the IED forms part of an electrical substation for managing electrical power transfer over the power transmission line.

ix. An intelligent electronic device, IED, for enabling communication for protection of electric equipment, the IED being configured to protect power system equipment, the IED comprising:
  a processor;
  a cellular radio module; and
  a memory storing instructions that, when executed by the processor, cause the IED to:
  detect channel quality using the cellular radio module;
  transmit packets using the cellular radio module, each packet comprising data relating to samples of electric measurements for protecting power system equipment; and
  increase sample rate of the electric measurements when the channel quality is worse than a first threshold.

x. The IED according to embodiment ix, wherein the communication is an end-to-end communication between the IED and a peer IED.

xi. The IED according to embodiment ix or x, wherein the IED further comprises instructions that, when executed by the processor, cause the IED to:
  increase transmission power when the channel quality is worse than the first threshold.

xii. The IED according to any one of embodiments ix to xi, wherein the IED further comprises instructions that, when executed by the processor, cause the IED to:
  transmit a signal to a peer IED indicating that the channel quality is worse than the first threshold.

xiii. The IED according to any one of embodiments ix to xii, wherein the IED further comprises instructions that, when executed by the processor, cause the IED to:
  enter a backup mode when the channel quality is worse than a second threshold, wherein the second threshold is more severe than the first threshold, and wherein the backup mode is an operational mode in which protection is performed without the need to communicate with external entities.

xiv. An electrical substation for managing electrical power transfer over a power transmission line, wherein the electrical substation comprises the IED according to any one of embodiments ix to xiii.

xv. A computer program for enabling communication for protection of electric equipment, the computer program comprising computer program code which, when run on an intelligent electronic device, IED being configured to protect power system equipment, causes the IED to:
  detect channel quality using the cellular radio module;
  transmit packets using the cellular radio module, each packet comprising data relating to samples of electric measurements for protecting power system equipment; and increase sample rate of the electric measurements when the channel quality is worse than a first threshold.

xvi. A computer program product comprising a computer program according to embodiment xv and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for enabling communication of data relating to samples of electric measurements, the method being performed in an intelligent electronic device, IED, including a cellular radio module, the IED being configured to protect power system equipment, the method comprising the steps of:
   detecting channel quality using the cellular radio module, the channel quality relating to a channel between the IED and a base station;
   transmitting packets using the cellular radio module, each packet including data relating to samples of electric measurements of voltages and/or currents expressed as phasors, to enable fault detection by comparison of phasors from different substations obtaining measurements of a power transmission line to perform line differential protection; and
   increasing sample rate of the electric measurements when the channel quality is worse than a first threshold.

2. The method according to claim 1, wherein the communication is an end-to-end communication between the IED and a peer IED.

3. The method according to claim 2, wherein the method further comprises the step of:
   increasing transmission power when the channel quality is worse than the first threshold.

4. The method according to claim 1, wherein the method further comprises the step of:
   increasing transmission power when the channel quality is worse than the first threshold.

5. The method according to claim 1, wherein the method further comprises the step of:
   transmitting a signal to a peer IED indicating that the channel quality is worse than the first threshold.

6. The method according to claim 1, wherein the method further comprises the step of:
   entering a backup mode when the channel quality is worse than a second threshold, wherein the second threshold is more severe than the first threshold, and wherein the backup mode is an operational mode in which protection is performed without the need to communicate with external entities.

7. The method according to claim 1, wherein the channel quality is determined using any one or more of signal to noise ratio, signal to interference and noise radio, and number of packets lost per a unit of time.

8. The method according to claim 1, further comprising the steps of:
   evaluating when channel quality deterioration occurs, to determine at what time channel quality deteriorations are more likely to occur; and
   increasing the sampling rate of the electric measurements, at the time that channel quality deterioration is more likely to occur.

9. The method according to claim 1, wherein the IED forms part of an electrical substation for managing electrical power transfer over the power transmission line.

10. An intelligent electronic device, IED, for enabling communication of data relating to samples of electric measurements, the IED being configured to protect power system equipment, the IED comprising:
    a processor;
    a cellular radio module; and
    a memory storing instructions that, when executed by the processor, cause the IED to:
    detect channel quality using the cellular radio module, the channel quality relating to a channel between the IED and a base station;
    transmit packets using the cellular radio module, each packet including data relating to samples of electric measurements of voltages and/or currents expressed as phasors, to enable fault detection by comparison of phasors from different substations obtaining measurements of a power transmission line to perform line differential protection; and
    increase sample rate of the electric measurements when the channel quality is worse than a first threshold.

11. The IED according to claim 10, wherein the communication is an end-to-end communication between the IED and a peer IED.

12. The IED according to claim 11, wherein the IED further comprises instructions that, when executed by the processor, cause the IED to:
    increase transmission power when the channel quality is worse than the first threshold.

13. The IED according to claim 10, wherein the IED further comprises instructions that, when executed by the processor, cause the IED to:
    increase transmission power when the channel quality is worse than the first threshold.

14. The IED according to claim 10, wherein the IED further comprises instructions that, when executed by the processor, cause the IED to:
    transmit a signal to a peer IED indicating that the channel quality is worse than the first threshold.

15. The IED according to claim 10, wherein the IED further comprises instructions that, when executed by the processor, cause the IED to:
    enter a backup mode when the channel quality is worse than a second threshold, wherein the second threshold is more severe than the first threshold, and wherein the backup mode is an operational mode in which protection is performed without the need to communicate with external entities.

16. An electrical substation for managing electrical power transfer over a power transmission line, wherein the electrical substation comprises an IED including:
    a processor;
    a cellular radio module; and
    a memory storing instructions that, when executed by the processor, cause the IED to:
    detect channel quality using the cellular radio module, the channel quality relating to a channel between the IED and a base station;
    transmit packets using the cellular radio module, each packet including data relating to samples of electric measurements of voltages and/or currents expressed as phasors, to enable fault detection by comparison of phasors from different substations obtaining measurements of a power transmission line to perform line differential protection; and increase sample rate of the electric measurements when the channel quality is worse than a first threshold.

17. A computer program stored on a non-transitory computer readable medium for enabling communication of data relating to samples of electric measurements, the computer program comprising computer program code which, when run on an intelligent electronic device, causes the IED to: detect channel quality using the cellular radio module, the channel quality relating to a channel between the IED and a base station; transmit packets using the cellular radio module, each packet including data relating to samples of electric measurements of voltages and/or currents expressed as phasors, to enable fault detection by comparison of phasors from different substations obtaining measurements of a power transmission line to perform line differential protection; and increase sample rate of the electric measurements when the channel quality is worse than a first threshold.

18. A computer program product comprising: a computer program for enabling communication of data relating to samples of electric measurements, the computer program comprising computer program code which, when run on an intelligent electronic device, causes an IED to: detect channel quality using the cellular radio module, the channel quality relating to a channel between the IED and a base station; transmit packets using the cellular radio module, each packet including data relating to samples of electric measurements of voltages and/or currents expressed as phasors, to enable fault detection by comparison of phasors from different substations obtaining measurements of a power transmission line to perform line differential protection; and increase sample rate of the electric measurements when the channel quality is worse than a first threshold; and a non-transitory computer readable means on which the computer program is stored.

* * * * *